United States Patent [19]
Pitner

[11] 3,901,048
[45] Aug. 26, 1975

[54] UNIVERSAL JOINT YOKE

[75] Inventor: Alfred Pitner, Paris, France

[73] Assignee: Nadella S.A., France; a part interest

[22] Filed: May 10, 1973

[21] Appl. No.: 358,925

[52] U.S. Cl............................ 64/17 R; 64/1 C; 64/6
[51] Int. Cl.............................................. F16d 3/26
[58] Field of Search ........ 64/17 A, 17 SP, 17 R, 12, 64/6, 1 C, 13, 1 V

[56] References Cited
UNITED STATES PATENTS

| 1,748,486 | 2/1930 | Lord | 64/17 R |
| 2,067,283 | 1/1937 | Padgett | 64/17 R |
| 2,476,473 | 7/1949 | Ashton | 64/17 SP |
| 3,462,973 | 8/1969 | Venable | 64/17 R |

FOREIGN PATENTS OR APPLICATIONS

| 732,018 | 1/1943 | Germany | 64/1 C |
| 501,171 | 1/1938 | United Kingdom | 64/1 C |
| 522,751 | 6/1940 | United Kingdom | 64/1 C |

Primary Examiner—Samuel Scott
Assistant Examiner—Randall Heald
Attorney, Agent, or Firm—Robert E. Burns;
Emmanuel J. Lobato; Bruce L. Adams

[57] ABSTRACT

The yoke is obtained from a blank of sheet metal whose general shape is that of a diamond having unequal diagonals. The ear portions of the yoke are obtained by folding at 90° two triangular portions of the diamond shape located on the larger diagonal. The middle portion of the blank, which is defined by the folding lines and disposed symmetrically with respect to the small diagonal, remains plane and includes at its respective end portions apertures for fixing the base portion of the yoke to a disc of elastomer material, constituting shock-absorbing means, by bolts and nuts. Each ear portion comprises a bore for mounting needle bearing cups which cap two trunnions of a universal joint cross member.

7 Claims, 11 Drawing Figures

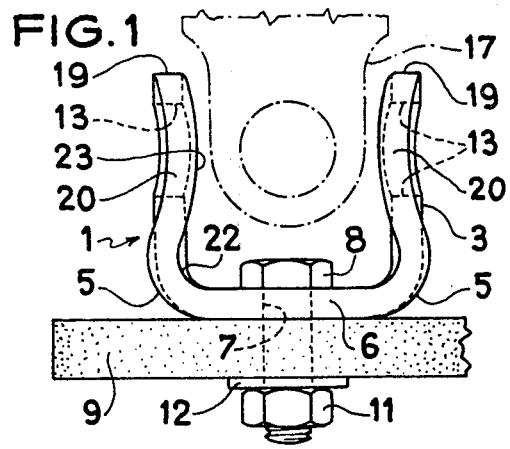
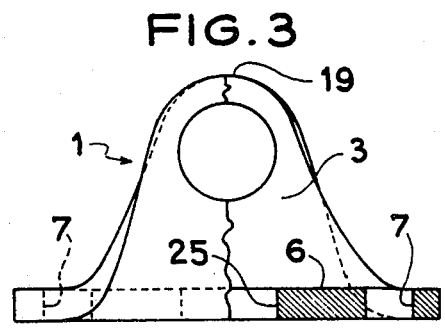
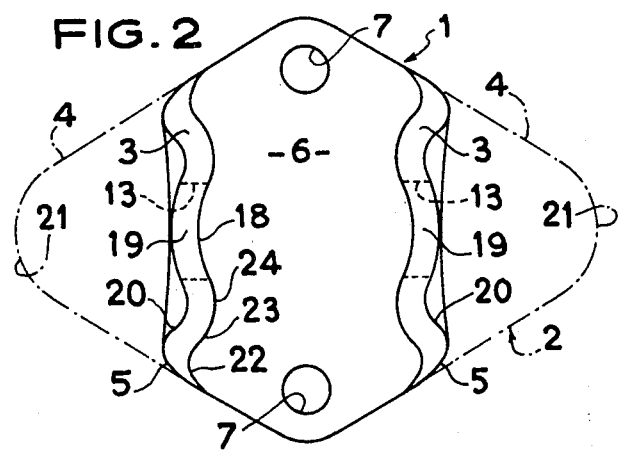
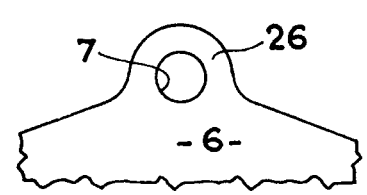
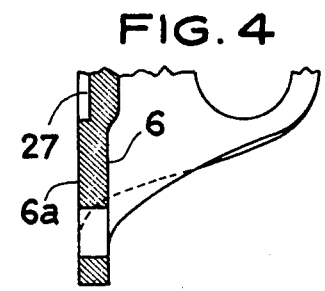
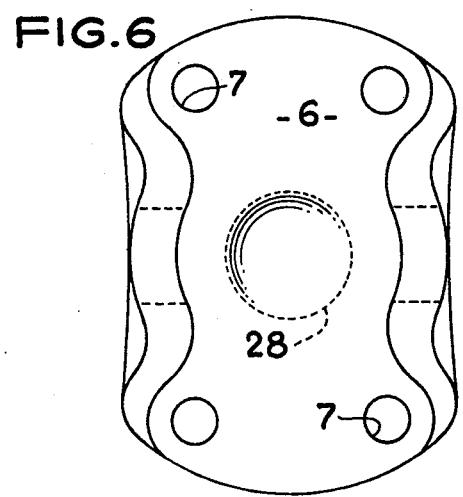
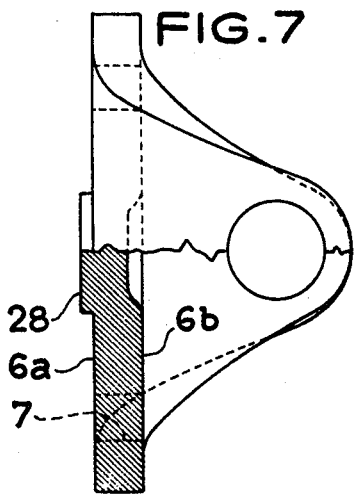

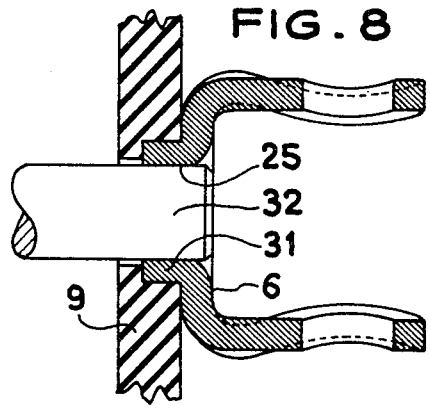
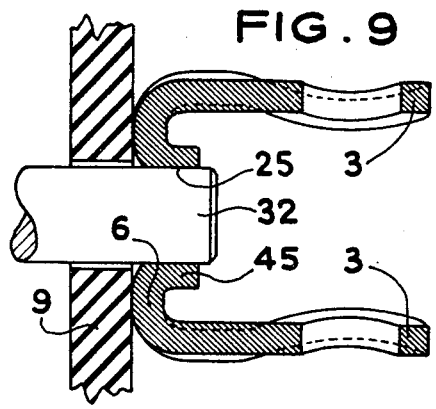
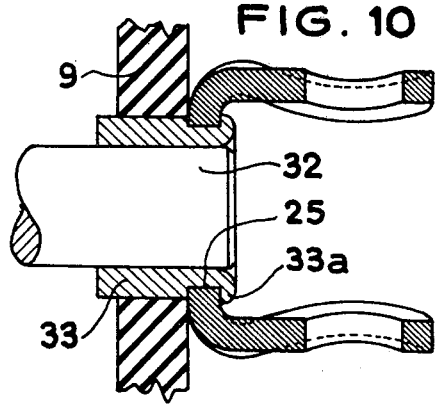
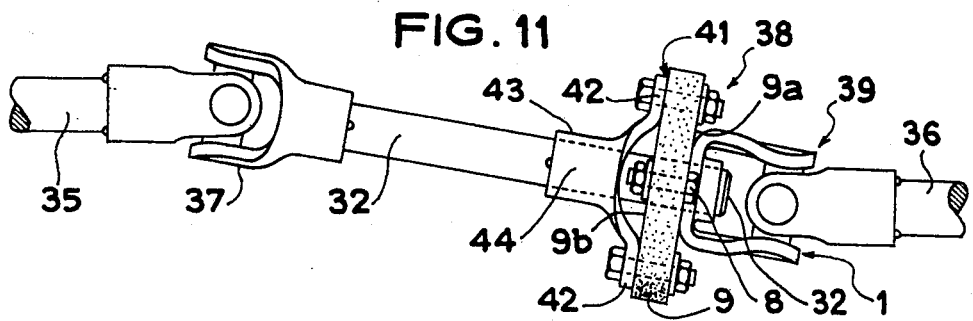

UNIVERSAL JOINT YOKE

The present invention relates to universal joint yokes obtained by folding a sheet metal blank and including two ear portions which are provided with bores for mounting the bearings of two of the trunnions of a cross member and are interconnected by a base portion provided with means for securing the yoke to a torque-transmitting element.

Known yokes are formed from a blank cut into the shape of a four-branch star two opposite branches of which are bent so as to form ear portions of the yoke whereas fixing apertures are provided in the two other branches. Such an arrangement has the drawback of resulting, owing to the cut-away portions of the blank, in a discontinuity in the contour of the yoke and a reduction in the dimensions of the branches along their fold line with respect to the base portion.

Consequently, the known yokes do not have the desired stiffness in respect of the forces they are called upon to withstand in operation.

In order to stiffen and strengthen the yoke as concerns the forces to which it is subjected, an object of the present invention is to provide an arrangement in which the initial blank has the general shape of a diamond one of the diagonals of which coincides with an axis on which the two bores adapted to receive the trunnions of the universal joint are aligned.

A yoke constructed in this manner has high strength owing to its generally channel-shaped cross section. The fold lines between the ear portions and the base portion, which latter includes a preferably flat part, have a relatively large dimension which extends substantially throughout the length of the base portion serving to secure the yoke so that a large amount of metal participates in the resistance to the forces produced in the transmission of the torque by the cross member when the yoke is incorporated in a universal joint. This flat part of the base portion may then bear on a mechanical member integral with the torque-transmitting element so as to ensure positioning.

In order to increase the extent of the allowed angular movements of the cross member, it is arranged according to the present invention that in the region of the fold the two ear portions widen in the direction of the ends of the base portion corresponding to the smaller diagonal of the diamond shape and the inner surface adjacent the corresponding lateral edges of each ear portion is formed so as to have an inwardly-facing concavity which throws the material outwardly at least near the part in the vicinity of that receiving the bores.

In the region of the bores, which are formed throughout the thickness of the sheet metal, the inner surface of each ear portion of the yoke has preferably a concave shape which is substantially defined by a cylinder having an axis perpendicular to the base portion. Such an arrangement, described in French Pat. No. 1,515,051, facilitates the mounting by a tilting motion of the cross member while it always maintains the bearings capping the trunnions in bearing relation.

The invention will be described in the ensuing description with reference to the accompanying drawings in which:

FIG. 1 is an elevational view of a universal joint yoke fixed to an elastically yieldable connecting element;

FIG. 2 is a plan view of the yoke shown in FIG. 1 in which the blank from which the yoke is formed is shown in dot-dash line;

FIG. 3 is an elevational view, taken at 90° to FIG. 1, of a yoke whose flat base portion comprises a centering aperture in its centre;

FIG. 4 is a partial view of a modification of the yoke shown in FIG. 3;

FIG. 5 is a partial plan view of a modification of the shape of the flat base portion;

FIG. 6 is a plan view similar to FIG. 2 of a yoke having four fixing apertures;

FIG. 7 is an elevational view of the yoke shown in FIG. 6;

FIGS. 8, 9 and 10 are views of modifications of the yoke for guiding a transmission shaft, and FIG. 11 is a view of an assembly in which a universal joint yoke according to that shown in FIG. 9 is incorporated.

The universal joint yoke 1 shown in FIGS. 1 and 2 is obtained from a blank 2 of sheet metal whose general shape is that of a diamond having unequal diagonals. The ear portions 3 of the yoke are obtained by folding up at 90° two triangular portions 4 of the diamond which are located on the larger diagonal. The middle portion 6 of the blank, defined by the fold lines 5 disposed symmetrically with respect to the smaller diagonal, remains plane and includes at its end portions apertures 7 for securing the base portion of the yoke to a disc of elastomer material 9 constituting damping or shock-absorbing means by bolts 8 and nuts 11 which clamp the disc 9 between the base portion 6 of the yoke and washers 12 in contact with the nuts 11.

Each ear portion 3 has a part defining a throughway bore 13 in the sheet metal for mounting, with interposition of a needle bearing cup, the trunnions of a universal joint cross member 17.

In the part defining the bores 13 the inner surface 18 of the ear portion 3 has a concave substantially part-cylindrical shape which is perpendicular to the flat base portion 6. The end edge 19 of the ear portions 3 remote from the base portion 6 is convex and defined by the rounded ends 21 of the initial blank 2 which are located on the larger diagonal.

In the region of the fold line 5, the two ear portions 3 diverge in a direction toward the base portion 6 in parts of lateral edge portions of the ear portions adjacent the base portion which imparts to the inner surface a marked concavity 22 which is connected to the convex end edge 19 by a convex portion 23. When seen in plan (FIG. 2), each lateral edge 20 defining the inner surface has a substantially sinusoidal shape consisting of adjoining portions 22, 23 and 18. Thus there is an inwardly projecting rib portion 24 extending along each side of the cylindrical surface 18 of the part defining the bore 13.

In FIG. 3, an aperture 25 formed in the centre of the base portion 6 is provided for centering a transmission shaft with which the yoke 1 may be rendered integral in a manner comparable to the arrangement shown in FIGS. 8 and 9.

In the embodiment shown in FIG. 4, the flat base portion 6 includes for centering the transmitting element a centre recess 27 obtained by stamping the outer surface 6a.

In FIG. 5, the ends of the flat base portion 6, instead of being triangular, are in the form of projecting portions 26 of part-circular contour in the centre of which a fixing aperture 7 is provided.

In FIGS. 6 and 7, the yoke is made from thicker sheet metal than in the foregoing embodiments and has four apertures 7 disposed symmetrically in the flat base portion so as to permit employing it as a flanged yoke in automobile vehicle transmissions. The centre part of the flat base portion is deformed by a stamping of its inner surface 6b which produces on the outer surface 6a a projecting portion 28 for a relative centering between the yoke and the mechanical element which receive the yoke and has a recess in which the projecting portion 28 is engaged.

The yoke shown in FIG. 8 includes, in the same way as the yoke shown in FIG. 3, a centre aperture 25 but this aperture is defined by a cylindrical extension 31 of the base portion 6 obtained by a press operation and in which the end portion of a transmission shaft 32 is guided. The quality of the relative sliding between the shaft and the cylindrical extension may be improved by a coating of plastics material or by a sleeve having a low coefficient of friction.

In FIG. 9, the yoke comprises, in the same way as the yoke shown in FIG. 3, a centre aperture 25, but this aperture is defined by a cylindrical extension 45 of the base portion 6 obtained by a press operation and in which is guided the end portion of a transmission shaft 32, but as opposed to the arrangement shown in FIG. 8, this cylindrical extension 45 extends in the space between the ear portions 3 of the yoke 1 which are longer than in the foregoing embodiments in order to ensure a satisfactory angular movement of the universal joint.

In FIG. 10, the flat base portion 6 has a centre aperture 25 which is simply pierced in the metal and in which is retained by a formed-over portion 33a a ring 33 which extends through the elastomer disc 9 and is composed of self-lubricating material or of a metal having good sliding properties with respect to the metal of the shaft 32 engaged in the sleeve 33.

FIG. 11 shows, as an example of an assembly including a yoke according to the invention, a transmission mechanism including two end shafts 35, 36 which are interconnected by an intermediate shaft 32 with interposition of two universal joints 37, 38, the joint 37 being a normal universal joint and the other joint 38 being a universal joint 39 combined with an elastically yieldable connecting element 41 of the "flector" type. The yoke 1 of the joint 39, which is connected to the intermediate shaft 32, is in accordance with the embodiment shown in FIG. 9. On the surface 9b of the disc 9 of reinforced elastomer opposed to the surface 9a carrying the yoke 1 there are secured — in a position offset 90° with respect to the bolts 8 securing the yoke — the two flanges 42 of a yoke 43 of the elastically yieldable connecting element whose collar 44 is secured to the intermediate shaft 32. The disc 9, while transmitting the torque, performs the function of means damping or absorbing vibrations without performing the function of a universal joint, since this is the function of the joint 39.

Having thus described my invention, what I claim as new and desire to secure by Letters Patent is:

1. In a universal joint yoke comprising a bent sheet metal blank comprising two ear portions which have a part defining two bores for mounting bearings for two trunnions of a universal joint cross member, and a base portion interconnecting the two ear portions which extend at an angle to the base portion; the following features: the shape of the bent sheet metal blank is such that the blank before being bent has substantially the general shape of a diamond having a small diagonal and a large diagonal, the two bores being substantially aligned on the large diagonal, said base portion defines at least one aperture on each side of said large diagonal for fixing the yoke to a part of torque-transmitting means and in the region of the bores each ear portion has a concave substantially part cylindrical shaped portion substantially perpendicular to the base portion.

2. In a universal joint yoke comprising a bent sheet metal blank comprising two ear portions which have a part defining two bores for mounting bearings for two trunnions of a universal joint cross member, a base portion interconnecting the two ear portions which extend at an angle to the base portion; the following features: the shape of the bent sheet metal blank is such that the blank before being bent has substantially the general shape of a diamond having a small diagonal and a large diagonal, the two bores being substantially aligned on the large diagonal, said base portion defines at least one aperture on each side of said large diagonal for fixing the yoke to a part of torque-transmitting means and each ear portion comprises on an inner surface facing the other ear portion two projecting rib portions which respectively extend from an end of the rib portions adjacent the base portion in a direction away from the base portion on each side of said part of the ear portion defining the bore, which part is set back from the two rib portions.

3. A yoke as claimed in claim 2, wherein said part defining the bores consists of the thickness of the sheet metal in which the bores are throughway bores.

4. A yoke as claimed in claim 2, wherein the two ear portions are divergent in the direction toward the base portion in parts of lateral edge portions of the ear portions adjacent the base portion, the corresponding lateral edges defining the inner surface of each ear portion having, when viewed in a direction perpendicular to the base portion, a substantially sinusoidal shape comprising a concave portion in the region of the part defining the bore, two convex portions corresponding to the two rib portions and two outer concave portions.

5. A yoke as claimed in claim 1, wherein said base portion includes a centre aperture for engaging said part of the torque-transmitting means.

6. A yoke as claimed in claim 1, wherein said base portion of the yoke comprises means defining a cylindrical hollow extension of the base portion for guiding said part of the torque-transmitting means.

7. A yoke as claimed in claim 1, wherein said base portion defines a centre aperture and a sleeve for guiding said part of the torque-transmitting means engaged in the centre aperture.

* * * * *

UNITED STATES PATENT OFFICE
CERTIFICATE OF CORRECTION

PATENT NO. : 3,901,048
DATED : August 26, 1975
INVENTOR(S) : Alfred Pitner

It is certified that error appears in the above-identified patent and that said Letters Patent are hereby corrected as shown below:

In the Heading, Item [73] Assignee delete "Nadella S.A." and insert --Nadella--.

Signed and Sealed this twenty-third Day of March 1976

[SEAL]

Attest:

RUTH C. MASON
*Attesting Officer*

C. MARSHALL DANN
*Commissioner of Patents and Trademarks*